Oct. 11, 1955   H. L. HANSON   2,720,618
BALANCING CIRCUITS FOR ELECTRIC MOTOR CONTROL SYSTEM
Filed Nov. 28, 1951   2 Sheets-Sheet 1
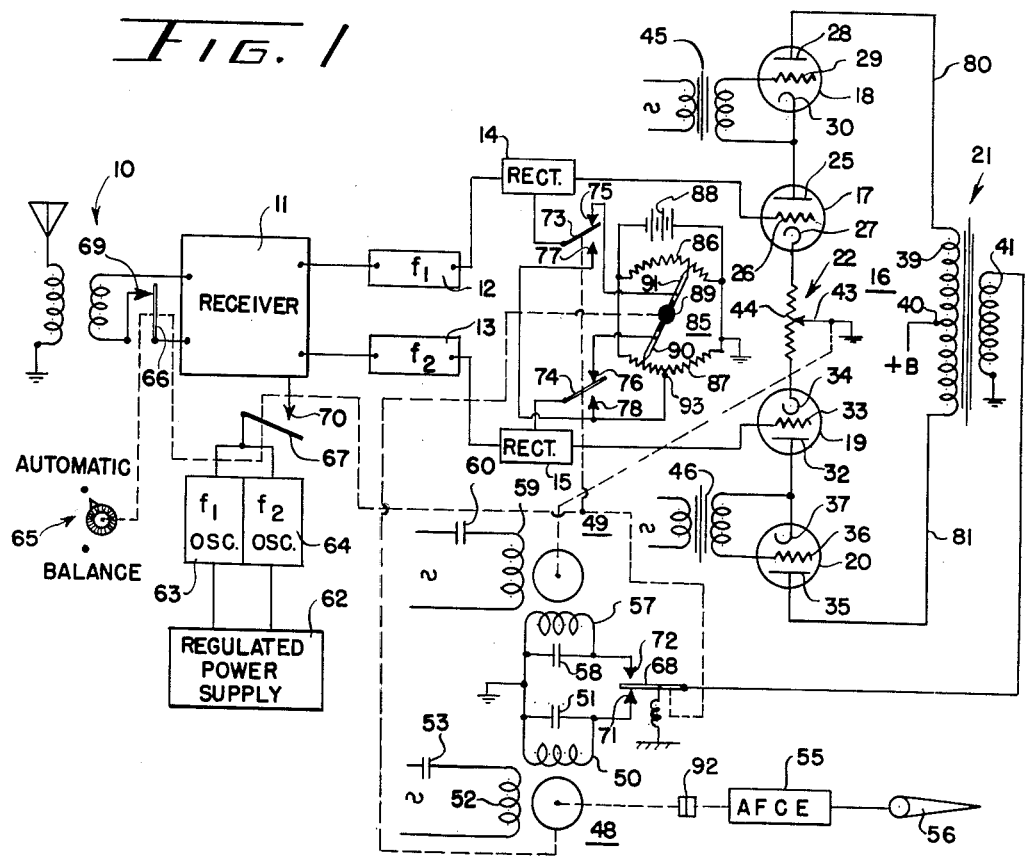
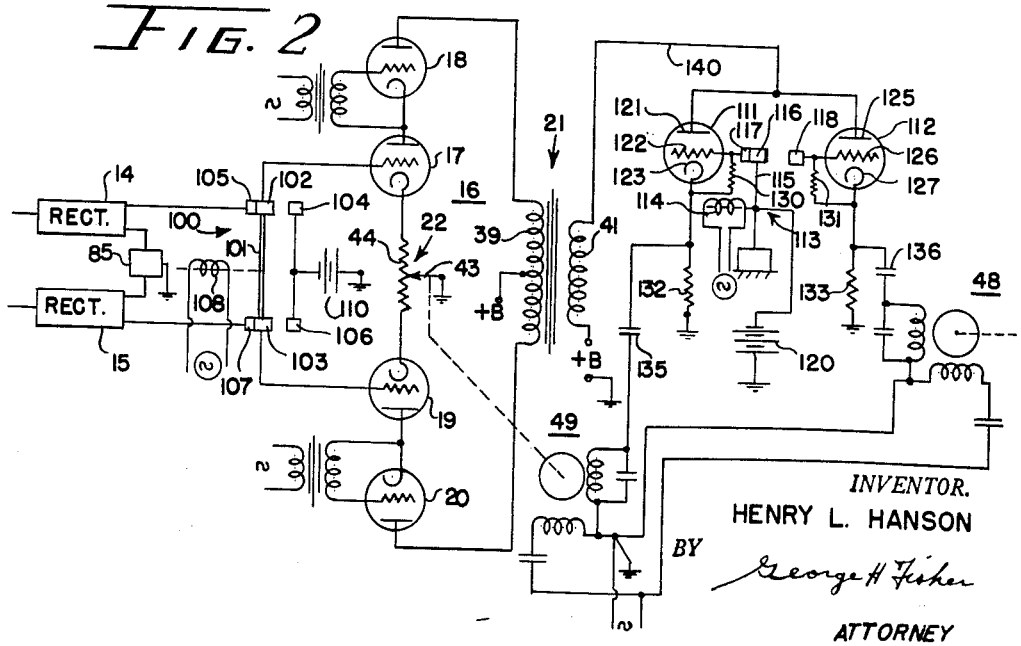
INVENTOR.
HENRY L. HANSON
BY George H Fisher
ATTORNEY INVENTOR.
HENRY L. HANSON
BY
George H Fisher
ATTORNEY

United States Patent Office 2,720,618
Patented Oct. 11, 1955

2,720,618

BALANCING CIRCUITS FOR ELECTRIC MOTOR CONTROL SYSTEM

Henry L. Hanson, Hopkins, Minn., assignor to Minneapolis-Honeywell Regulator Company, Minneapolis, Minn., a corporation of Delaware Application November 28, 1951, Serial No. 258,630

14 Claims. (Cl. 318—19)

The present invention is concerned with a new and improved signal modulating and motor control circuit. More particularly, the present invention is concerned with a motor control circuit wherein a control motor is arranged to be reversibly driven by a pair of modulated signal current flow control circuits where provision is made to maintain the current flow in the control circuits balanced when the input signal to the control apparatus is balanced.

In certain automatic control equipment, particularly in the field of blind landing equipment for aircraft, automatic control is obtained from signals transmitted from a central control station. In blind landing equipment, a desired line of travel of a controlled craft is defined by a pair of overlapping radio frequency beams, each of which is modulated at some desired low frequency, where the magnitudes of the modulated signals are equal. The control equipment in the craft is used to adjust the line of travel of the craft so that the modulated input signals from the beams are maintained equal as the craft comes in for a landing. The control signals are demodulated and the modulating frequency converted to a direct current. These direct current signals are generally reconverted into a modulated signal which has a frequency corresponding to the frequency of the craft's power supply so that a control motor may be readily controlled thereby. If there should be any unbalance of the circuits of the control equipment or the modulator, an actual balance, as far as the control beams are concerned, cannot be obtained and therefore the craft may be several feet off the desired course which may be disastrous.

It is therefore an object of the present invention to provide a new and improved apparatus for balancing the control circuits for a controlled motor.

Another object of the present invention is to provide a new and improved control signal modulator circuit.

Still another object of the present invention is to provide a pair of control circuits for a controlled motor with means for balancing the output electrical characteristics of the control circuits when the input signal to these circuits is balanced.

A further object of the present invention is to provide a control circuit for a controlled motor with apparatus for interrupting the normal input to said circuit and balancing the output electrical characteristics of said control circuit.

A still further object of the present invention is to provide a follow-up type of control circuit for a controlled motor where the normal input to the control circuit is periodically interrupted and a standard signal is fed into the circuit which is used to provide a balancing signal for a circuit balancing apparatus which is independent of the circuit follow-up.

These and other objects of the present invention will be understood upon considering the following specification and drawings of which:

Figure 1 shows schematically an arrangement of the present invention where manually actuated means are provided for obtaining a circuit balance;

Figure 2 shows schematically an arrangement where automatic circuit balancing is obtained;

Figure 3:
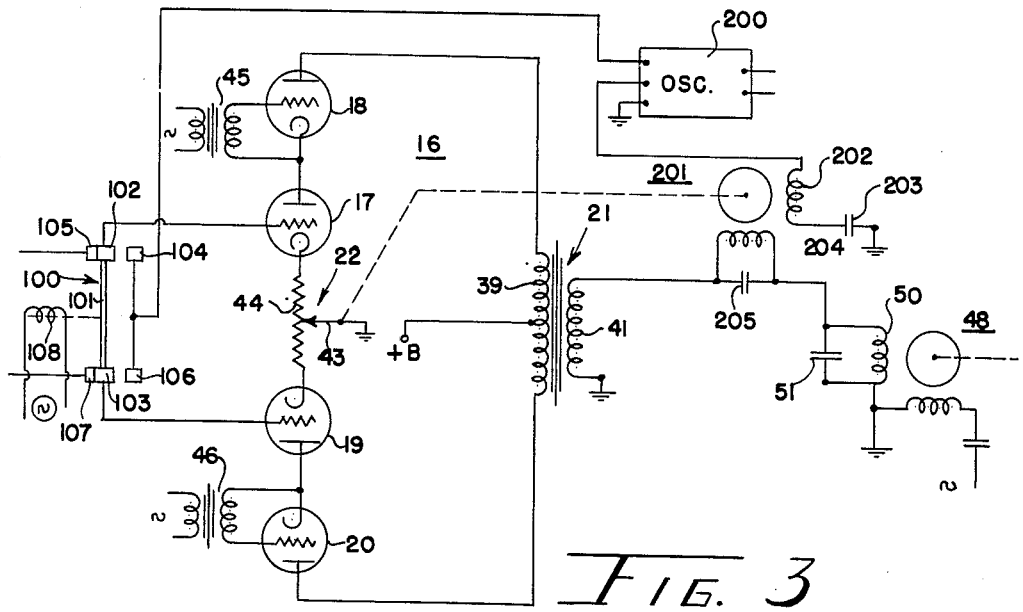
Figure 3 shows a further arrangement where two control motors operating at different frequencies are used to effect circuit balance and control.

Referring first to Figure 1, the numeral 10 represents an antenna assembly for a blind landing control apparatus which may be carried by an aircraft. This antenna assembly picks up the radiated signals from a suitable ground station and feeds them to a receiver 11. The receiver 11 is used to demodulate the input control signals and reduce the received signals to a pair of control signals $f_1$ and $f_2$. These control signals are fed through a pair of filter networks 12 and 13 and then to a pair of rectifiers 14 and 15. These rectifiers 14 and 15 have a direct current output voltage which is used to bias a suitable motor control network 16.

The motor control network 16 comprises a plurality of electron discharge devices 17, 18, 19, 20, an output transformer 21, and a control potentiometer 22.

The electron discharge device 17 comprises an anode 25, a control electrode 26, and a cathode 27 which may be heated to be electron emissive by any suitable means not shown. The electron discharge device 18 comprises an anode 28, a control electrode 29, and a cathode 30 which also may be heated to be electron emissive by any suitable means not shown. The electron discharge device 19 comprises an anode 32, a control electrode 33, and a cathode 34 while the electron discharge device 20 comprises an anode 35, a control electrode 36, and a cathode 37. The cathodes 34 and 37 may also be heated by any suitable means, not shown, so that the same are electron emissive.

The transformer 21 comprises a tapped input or primary winding 39 having a center tap at 40 and an output or secondary winding 41.

The control potentiometer 22 comprises a slider 43 and a slide-wire resistor 44. Connected between the control electrodes and cathodes of the discharge devices 18 and 20 are biasing transformers 45 and 46 having their primaries preferably connected to the aircraft's alternating current source of power.

The output winding 41 of the transformer 21 is arranged for connection to the control windings of one or the other of a pair of motors 48 and 49. The motor 48 comprises an input winding 50 with a suitable condenser 51 connected thereacross and a line winding 52 having in series therewith a suitable phase shifting condenser 53. This line phase winding is connected to the same source of power as the primaries of the biasing transformers 45 and 46. Motor 48 is arranged for connection to suitable automatic flight control equipment 55 which may be used to adjust an aircraft control surface 56. A Mosely patent, 2,423,337 shows one way in which a system of the present type may be used with a flight control system. The motor 49 comprises a control winding 57 which has connected in parallel therewith a suitable condenser 58. The motor also has a line phase winding 59 with a phase shifting capacitor 60 in series therewith. This line phase winding is also connected to a common source of power with the primaries of biasing transformers 45 and 46. The motor 49 is arranged for connection to the slider 43 of the control potentiometer 22.

Also included in the apparatus is a regulated power supply 62 which supplies voltages to a pair of oscillators 63 and 64 which produce frequencies corresponding to frequencies $f_1$ and $f_2$. The magnitudes of the control signals from these two oscillators are equal. A manually operated switch 65 is arranged to actuate a plurality of switch blades 66, 67, 68, 73 and 74. The switch blade 66 is normally in engagement with an associated contact 69 while the blade 67 is normally out of engagement with a contact 70. The blade 68 is normally biased into engagement with a contact 71 and is arranged for movement into engagement with a contact 72 when the manually operated control 65 is moved from the automatic to the balance position. Blades 73 and 74 are normally in engagement with contacts 75 and 76 respectively. When the control 65 is moved to the balance position, the blade 73 will engage contact 77 and blade 74 will engage contact 78.

A system balancing network is indicated at 85 and comprises a pair of potentiometer slide wires 86 and 87 whose ends are connected to a battery 88. A follow-up member 89, which is positioned by motor 48, insulatingly carries a pair of sliders 90 and 91 which cooperate with the respective potentiometer slide wires 87 and 86. The slide wire 87 is tapped at 93.

Operation of Figure 1

In considering the operation of Figure 1, let it first be assumed that the apparatus is in the position shown upon the drawing with the manual control 65 being positioned in the automatic position. When in this position, the switch blade 66 will be engaging contact 69 and the switch blade 68 will be engaging contact 71. With the controlled aircraft in flight and coming in on the radio control beams, the antenna 10 will be detecting the signals radiated from the ground station. These signals will be fed into the receiver 11 where they will be demodulated and reduced to a pair of control signals $f_1$ and $f_2$ and fed through the filters 12 and 13 to the rectifiers 14 and 15. The direct current produced on the outputs of the rectifiers 14 and 15 is added to the rebalancing signals from network 85 and the resultant signals are used to control the control electrode potentials of the electron discharge devices 17 and 19 respectively. The current flow for the electron discharge device 17 may be traced from the +B terminal connected to tap 40 of input winding 39 of transformer 21 through the upper half of the input winding 39, conductor 80, anode 28, cathode 30, anode 25, cathode 27, the upper half of slide-wire resistor 44, and slider 43 to ground. It will be noted that the current flow for the electron discharge device 17 is traced through the discharge device 18. Since the device 18 has an alternating current signal connected between the grid and cathode thereof, the device 18 will act as a variable resistance whose resistance will be varying at a rate dependent upon the frequency of the alternating current on the primary of the biasing transformer 45, ordinarily, in aircraft, 400 cycles. With a direct current biasing signal from rectifier 14 and follow-up network 85 on slider 91 applied to control electrode 26, it will be seen that the current flow in this series circuit which includes the discharge devices 17 and 18 will be dependent upon the magnitude of this biasing voltage and also upon the alternating bias applied to the discharge device 18. Thus, the direct current signal on 17 is varied at a 400 cycle rate so that in effect the control signal on electrode 26 is combined or added to the 400 cycle signal originating in the discharge device 18.

The current flow circuit for the discharge device 19 may be traced from the +B terminal connected to tap 40 of winding 39 through the lower half of the winding 39, conductor 81, anode 35, cathode 37, anode 32, cathode 34, the lower half of slide-wire resistor 44, and slider 43 to ground. As the discharge device 20 has an alternating current bias supplied thereto, it will act as a variable resistance which will be varying at a rate dependent upon the input control signal which will be the same as that of discharge device 18. Further, the bias signal originating from the rectifier 15 and follow-up network on slider 90 will be regulating the current flow through the discharge device 19 so that the net current flow through the circuit which includes the discharge devices 19 and 20 will be the resultant of the combined biasing signals on the discharge devices 19 and 20.

It will be noted that the current flows through the discharge devices 17 and 18 and that through devices 19 and 20 are in opposite directions through the winding 39. Since they are in opposite directions and occur at the same time they tend to oppose each other and if the current flows are of equal magnitude in each of the two circuits then there will be no resultant flux applied to the output winding 41. With no output in the winding 41 there will be no current flow through the control winding 50 of the motor 48 so that this motor will remain in a fixed position.

If the aircraft should deviate from the desired line of flight so that the control frequencies $f_1$ and $f_2$ appear with different magnitudes, the biasing effects from the rectifiers 14 and 15 will be different so that the current flows in the control circuit including devices 17 and 18 and 19 and 20 will be different. This difference in current flow through the devices 17 and 18 when compared with that of 19 and 20 will cause the circuit having the greater current flow to produce more flux in the input winding 39 so that it will be predominant and produce an output signal in the output winding 41. This output signal will be fed to the control winding 50 of motor 48 and phased so that the motor will rotate and through a clutch adjust the automatic flight control equipment 55 and thus make appropriate corrections upon the control surface 56 to cause the aircraft to move back to its proper position on the landing beam. As the motor 48 adjusts the automatic flight control equipment 55, it also adjusts the follow-up member 89 and the sliders 90 and 91 so that there will be a system balance and the motor 48 will not operate beyond the condition of unbalance due to divergence from the landing beam. Depending upon the direction of operation of motor 48, the sliders 90 and 91 will be adjusted to counteract the voltage unbalance on the outputs of the rectifiers 14 and 15 so that the net input to each of the devices 17 and 19 will be the same. It will be noted that when the sliders 90 and 91 are centered on their respective slide wires the voltage on each slider will be the same. As the member 89 is rotated, the voltage on one slider will decrease and the other will increase with respect to ground. As soon as the control surface 56 has moved the controlled craft back to its appropriate position on the landing beam, the input signals $f_1$ and $f_2$ will become balanced or of equal magnitude so that the motor 48 will operate to restore balance on the inputs to the motor control circuit 16 by repositioning the follow-up member 89 until there will be no further rotation of the control motor 48. The movement of motor 48 will also cause readjustment of the automatic flight control to bring the craft to steady flight on the beam.

Inasmuch as the apparatus depends for its operation upon there being a current balance in the control circuit 16 when the magnitudes of the two control signals $f_1$ and $f_2$ are equal, it is essential that the circuit constants of the electron discharge devices 17 and 18 and 19 and 20 be selected to be as near matched as possible. As the matching of these discharge devices is difficult and due to the fact tht discharge devices age so that their characteristics drift after they have been in use for a period of time, it is essential that provision be made for balancing these characteristic differences which may result in causing control motor operation when such operation is not desired.

In Figure 1, the balancing of the currents in the motor control circuit 16 is accomplished manually by the adjustment of the controller 65 from the automatic position over to the balance position. When moved to this position, the switch blade 66 will move out of engagement with contact 69 and the blade 67 will engage contact 70. The blade 68 will move out of engagement with contact 71 and will move into engagement with contact 72. Blades 73 and 74 are moved from engagement with contacts 75 and 76 to engagement with contacts 77 and 78. With the controller 65 in this position, the radio signals from the antenna 10 will be cut out and the standard signals arising from the oscillators 63 and 64 will now be fed into the receiver where the same will be passed through the filters 12 and 13 to the rectifiers 14 and 15. The rectifiers 14 and 15 will produce a direct current biasing voltage for each of the discharge devices 17 and 19 respectively as was the case when the signals $f_1$ and $f_2$ originated from the antenna 10. This biasing voltage will be added to the biasing voltage from the tap 93 in the follow-up network 85. This tap is selected at the midpoint of the slide wire 87 because that is the value of biasing voltage which normally is added to the input biasing circuit when the whole system is balanced and the sliders 90 and 91 are centered. In other words, the rebalancing operation takes place with a biasing voltage on the input to devices 17 and 19 which is in their normal operating range.

If the resultant current flows through the upper and lower halves of the input winding 39 are balanced, there will be no output signal in the output winding 41 and therefore the motor 49 will remain stationary. However, if the current flows are unbalanced due to the shifting of the electrical characteristics in either of the control circuits, the resultant current flow through the winding 39 will produce an output at the output winding 41 and a control signal will be fed through the switch blade 68, switch contact 72, to the control winding 57 of motor 49 so that this motor 49 will rotate. The rotation of the motor 49 will be such as to position the slider 43 in a direction to change the self bias in the two control circuits including devices 17 and 19 so that the current flows will be balanced and the motor 49 will remain stationary.

As soon as the balancing operation is completed, the apparatus may be switched back to the automatic position so that it is possible to control the motor 48 in accordance with the signals picked up by the antenna 10. It will be thus assured that the movement or position of the motor 48 will be dependent upon the magnitudes of the control signals $f_1$ and $f_2$ originating from the antenna 10 and not due to any unbalance which may exist in the motor control circuit 16.

*Figure 2*

In Figure 2, elements which are similar to those shown in Figure 1 carry corresponding reference numerals. The modification in Figure 2 includes the addition of a vibrator 100 which comprises a vibrating member 101 which carries a pair of contactors 102 and 103 insulated from each other. The contactor 102 is arranged for movement between fixed contacts 104 and 105 while the contactor 103 is arranged for movement between contacts 106 and 107. The vibratory movement of the member 101 is imparted thereto by a suitable coil 108 which is connected to a suitable source of alternating power which is preferably in the 25 cycle range, or arranged considerably lower than the conventional power supply for the aircraft. Connected to the contacts 104 and 106 is a standard biasing battery 110. In the output circuit of the transformer 21 are a pair of switch tubes 111 and 112. These switch tubes are arranged to be rendered alternately conducting by a second vibrator 113 which comprises a vibrating coil 114 connected to the same source of power as the vibrating coil 108 and a vibratory element 115 which carries a contact 116 movable between a pair of fixed contacts 117 and 118. Elements 115 and 101 may be synchronously driven by a single drive even though shown separately on the drawing. If separately driven, care must be taken to see that there is positive synchronization. Connected to the contact 116 is a biasing battery 120. The discharge device 111 comprises an anode 121, a control electrode 122, and a cathode 123 which is heated to be electron emissive by a means not shown. The electron discharge device 112 comprises an anode 125, a control electrode 126, and a cathode 127 which is arranged to be heated to be electron emissive by a suitable means not shown. A grid resistor 130 is connected between the control electrode 122 and the cathode 123 and a similar grid resistor 131 is connected between the control electrode 126 and the cathode 127. A resistor 132 is connected in the cathode circuit of the discharge device 111 while a resistor 133 is connected in the cathode circuit of the discharge device 112. A capacitor 135 couples the output signal on the resistor 132 to the control motor 49 while a capacitor 136 couples the output signal on resistor 133 to the control motor 48.

*Operation of Figure 2*

In considering the operation of Figure 2, it will first be noted that the vibrators 100 and 113 are continuously operating at a relatively low frequency. During the half cycle of this low frequency operation which positions the vibratory elements 101 and 115 in the position shown upon the figure, the external control signals are effective to control the motor 48. This will be noted since the contactor 102 is engaging contact 105 so that the output of rectifier 14 is connected to control the current flow in the discharge device 17. Likewise, the contactor 103 is engaging contact 107 so that the output of rectifier 15 is controlling the current flow in the discharge device 19. It will thus be seen that the current flow in the motor control circuit 16 will be determined by the biasing voltage originating from the rectifiers 14 and 15. Therefore, the output signal on the winding 41 will be dependent upon the biasing voltages originating from these two rectifiers 14 and 15.

The functioning of the vibrator 113 is to determine which of the two control motors 48 or 49 is to be rendered operative by the control signals appearing upon the winding 41. When the vibratory element 115 is in the position shown wherein the contact 116 is engaging contact 117 the discharge device 111 is rendered non-conductive because of the fact that the biasing battery 120 is directly connected to the control electrode 122 and the discharge device is non-conductive. On the other hand, the discharge device 112 is conductive inasmuch as there is no biasing voltage applied directly to the discharge device and a current flow circuit may be traced from the +B terminal at the lower end of secondary 41 through conductor 140, anode 125, cathode 127, cathode resistor 133, and ground back to the power supply. With an unbalance signal appearing upon the secondary 41 the phasing of which will be dependent upon the dominating current flow in the motor control circuit 16, the signal will pass from the last traced circuit at the cathode resistor 133 through capacitor 136 to the control winding of the motor 48. This motor 48 will operate as in Figure 1 to adjust suitable flight control equipment to try to correct the error signal coming into the system.

When the vibratory element 101 moves in the opposite direction on a subsequent half cycle of the vibratory power supply frequency, the contactor 102 will engage contact 104 and contactor 103 will engage contact 106. These connections will effect a direct connection of the biasing standard signal source 110 to the control electrodes of the discharge devices 17 and 19. Since this biasing voltage is the same for both of the discharge devices, the current flow through the motor control circuit 16 should be balanced in both of its branches. That is, the current flow through the discharge devices 17 and 18 should be the same as that flowing through the discharge devices 19 and 20. If the current flows are not balanced, then there is danger that the unbalance may be causing false operation of the motor 48. Therefore, the vibratory element 115 on the same half cycle under consideration will be moved toward the right so that the contact 116 is engaging contact 118 to render the discharge device 112 non-conductive and removing the bias from discharge device 111 so that this discharge device may conduct. Any unbalance signal appearing upon the secondary 41 will now be able to pass through the switching tube 111 to the cathode resistor 132 and thence through the coupling capacitor 135 to the control winding of motor 49. The motor 49 will be rotated in a direction to eliminate the unbalance arising in the motor control circuit 16 by the repositioning of the slider 43 upon the slide-wire 44.

It will be seen in the arrangement shown in Figure 2 that a rebalancing of the motor control circuit 16 that balance is automatically obtained by periodically connecting a standard source control signal into the main control tubes of the motor control circuit 16. In this way it is assured that there will be no effective shifting of the electrical characteristics of the motor control circuit while the aircraft is coming in for a landing.

Figure 3

In Figure 3 the circuit has been modified by substituting an oscillator 200 for a standard signal source to be used during the balancing operation. This oscillator may be selected at some frequency which is higher than the aircraft's supply frequency, for example, 5,000 cycles. Operating in conjunction with this oscillator 200 is a balancing motor 201 which has a line winding 202 with a capacitor 203 in series therewith and arranged to be operative with a 5,000 cycle signal applied thereto when a control winding 204 is energized ninety degrees out of phase with respect to the line winding 202. The control winding 204 has a capacitor 205 connected in parallel therewith.

Operation of Figure 3

The operation of Figure 3 is very similar to that of Figure 2 in that the vibrator 100 is effective to move the contactors 102 and 103 between their respective contacts 104 and 105, and 106 and 107 respectively. When the contactor 102 is engaging contact 105 and contactor 103 is engaging contact 107, the apparatus will operate as explained in Figures 1 and 2 and the control motor 48 will be driven by any unbalance appearing in the motor control circuit 16.

When the vibrator 100 moves to the balancing position wherein the contactor 102 engages contact 104 and contactor 103 engages contact 106, the output from the oscillator 200 will be fed into the control electrode circuits of the discharge devices 17 and 19. If the resultant current flows in the motor control circuit in the upper half and lower half are not balanced with this auxiliary standard signal coming in, the unbalance in the winding 39 of transformer 21 will cause a pair of unbalance signals to appear upon the output winding 41. These unbalance signals will be comprised of a 400 cycle signal with a 5,000 cycle signal superimposed thereon. The phasing of the 5,000 cycle component will be such as to cause rotation of the motor 201 in a direction that will reposition the slider 43 on slide-wire 44 to rebalance the unbalance signals in the motor control circuit 16. While the 400 cycle component will pass through the control winding 204 of motor 201, the motor 201 is so designed as to not be saturated by this current flow. Further, the 400 cycle portion of the signal will effect the control motor 48 momentarily but since corrective action is being taken by the rebalancing motor 201, the effect upon the motor 48 and the automatic flight control equipment is negligible. The 5,000 cycle signal flowing in this output circuit through motor 48 will not effect motor 48 because the control winding 50 is by-passed by the capacitor 51 which presents low impedance to the 5,000 cycle signal.

As in Figure 2, the apparatus shown in Figure 3 is effective to maintain a continuous balance in the electrical conducting characteristics of the motor control circuit 16 which the control apparatus is in use.

Figure 4

Figure 4:
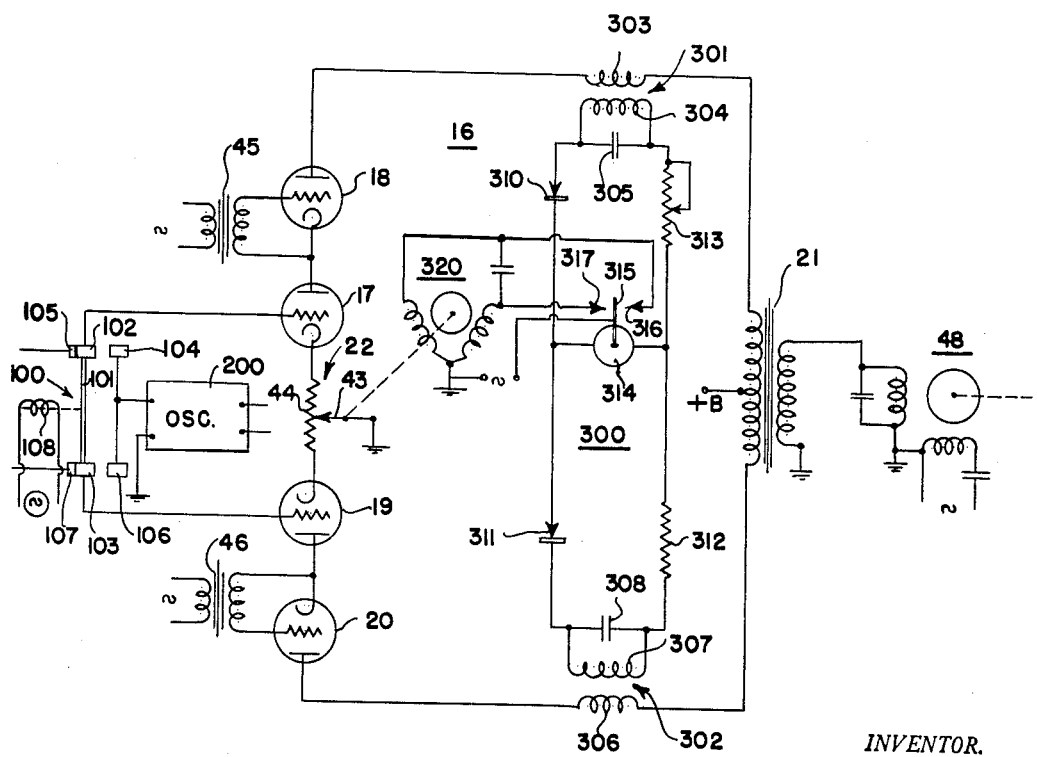
Figure 4 shows an arrangement where a pair of tuned circuits are used to check control circuit balance.

In the arrangement shown in Figure 4, the apparatus has been modified by incorporating a special balance detecting circuit 300. This balance detecting circuit comprises a pair of transformers 301 and 302. The transformer 301 has a primary winding 303 and a secondary winding 304 with a capacitor 305 connected in parallel with the latter. A transformer 302 comprises a primary winding 306, a secondary winding 307, the latter having a capacitor 308 connected in parallel therewith. The capacitors 305 and 308 are arranged to resonate at 5,000 cycles with the secondary windings 304 and 307 respectively. A rectifier 310 is connected in circuit with the secondary 304 and a further rectifier 311 is connected in circuit with the secondary 307. A pair of current limiting resisitors 312 and 313 are connected in circuit with the secondaries 307 and 304 respectively. The resistor 313 is arranged to be variable so as to balance the currents flowing in the two circuits. A galvanometer 314 is arranged to detect any difference in the currents flowing in the two rectifier circuits as will be explained hereinafter. The galvanometer 314 has a blade 315 and a pair of contacts 316 and 317. The blade 315 is normally centered between the contacts 316 and 317 when the current flow to the galvanometer is the same in both directions. A reversible two phase motor 320 is arranged to be reversibly driven by the galvanometer 314 depending upon which direction the galvanometer is positioned.

Operation of Figure 4

Considering the operation of Figure 4, it will be noted that the vibrator 100 is used in the same capacity as it was used in Figures 2 and 3 and that is to periodically switch a standard source into the motor control circuit 16. In the present arrangement, the oscillator 200 is periodically switched into the control circuit so that alternations appearing on the output of the oscillator will also appear in the motor control circuit 16 whenever the contactors 102 and 103 are engaging their respective balancing contacts 104 and 106 respectively. The alternations due to the oscillator 200 will be passing through the primary windings 303 and 306 of the transformers 301 and 302. These transformers at their secondary windings 304 and 307 when connected to the resonating capacitors 305 and 308 will have a predominant 5,000 cycle signal appearing thereacross. The signal appearing upon the transformer 304 will cause current to flow from the left-hand terminal thereof through the rectifier 310, galvanometer 314, and resistor 313 back to the other terminal of the secondary 304. The rectifier 310 will serve to pass only one-half cycle of the alternations appearing on the transformer 304. At the same time the alternations appearing upon the transformer 307 will cause current to flow from the right-hand terminal of the secondary 307 through resistor 312, galvanometer 314 and rectifier 311 back to the left-hand terminal of secondary 307. It will be noted that the current flow from the secondary 307 passing through the galvanometer 314 will be in a direction opposite to that flowing from the secondary 304. This will mean that if the currents flowing in these two circuits are balanced, the galvanometer will remain in a centered position. If the current flows through the galvanometer 314 are not balanced so that the blade 315 is moved into engagement with either of the contacts 316 or 317, the motor 320 will become operative depending upon which of the two contacts is closed and the motor 320 in turn will move the slider on the control potentiometer 22 to balance the conductivity of the circuits in the motor control circuit 16. As soon as the motor 320 has rebalanced the currents flowing in the motor control circuit 16, the galvanometer will move back to its center position so that the motor 320 will no longer be operative.

As soon as the vibrator 160 is moved back to its position shown upon the drawing, the normal input signals from the contacts 105 and 107 will be fed to the control electrodes of the devices 17 and 19 and the apparatus will operate to control the motor 48 in accordance with the differences in those signals.

From the foregoing it will be seen that there has been provided in Figure 4, as in Figures 2 and 3, an apparatus for maintaining a continuous state of electrical balance in a motor control circuit.

Conclusion

From the foregoing it will be noted that there has been provided in the present control apparatus a device for maintaining an electrical balance in a motor control circuit by either manually or automatically operative means. Further, there has been provided a new and improved signal combining circuit wherein it is possible to utilize a direct current control signal in the controlling of an alternating current motor. While many modifications will be of use to those skilled in the art, it is intended that the scope of the invention be limited solely by the appended claims, in which I claim:

1. Control apparatus, comprising in combination, a controlled motor, a pair of electronic devices connected to energize said motor and effect rotation of said motor in one direction or the other depending upon which of said pair has greater conductivity, conductivity control circuits connected to said pair of devices, circuit means effective when operative for connecting a balanced input to said pair of devices, and control means operative only when said last-named circuit means is operative to balance the conductivity of said pair of devices.

2. Control apparatus, comprising in combination, a motor to be controlled, first and second electronic current controlling devices connected to energize said motor and effect rotation of said motor in one direction or the other depending upon which of said devices has greater conductivity, first and second signal adding devices connected in circuit with said first and second electronic devices respectively to provide an alternating current flow to said motor, a variable input connected to said electronic devices to vary the current flow therethrough, a balanced input arranged for connection to said electronic devices, and control means operative only when said balanced input is connected to said devices to balance the conductivity of said electronic devices and said adding devices.

3. Control apparatus, comprising in combination, a motor to be controlled, first and second electronic current controlling devices connected to energize said motor and effect rotation of said motor in one direction or the other depending upon which of said devices has greater conductivity, first and second signal adding devices connected in circuit with said first and second electronic devices respectively to provide alternating current flow to said motor, said adding devices each comprising an electronic device having an input with an alternating current thereon and an output in series with its respective electronic device, a variable input connected to said first and second electronic devices to vary the current flow therethrough, a balanced input arranged for connection to said first and second electronic devices, and control means connected to said devices for balancing the current flow therethrough only when said balanced input is operative.

4. In combination, a controlled motor, a pair of variable electronic current flow control circuits connected to reversibly energize said motor, a pair of input circuits connected to said electronic circuits to vary the current flow therethrough, control means when operative for balancing the inputs of said electronic circuits and rendering said pair of input circuits inffective, and further control means actuated when said first named control means is operative to balance the current flow in said pair of circuits.

5. A motor control circuit comprising, a pair of closed electrical series circuits, each of said pair comprising an electronic device having its output circuit in series with a source of power, motor means connected to be reversibly driven by the difference in current flow in said pair of series circuits, input signal sources connected to vary the current flow in said pair of series circuits, a standard signal source, and control means rendering said input signal sources ineffective and connecting said standard signal source to control the current flow in said pair of series circuits for balancing the current flows in said pair of series circuits.

6. A motor control circuit comprising, a pair of closed electrical series circuits, each of said pair comprising an electronic device having its output circuit in series with a source of power, motor means connected to be reversibly driven by the difference in current flow in said pair of series circuits, input signal sources connected to vary the current flow in said pair of series circuits, a standard signal source, switch means rendering said input signal source ineffective and connecting said standard signal source to control the current flow in said pair of series circuits, and electromechanical means actuated simultaneously with said switch means for balancing the current flows in said pair of series circuits.

7. A motor control circuit comprising, a pair of closed electrical series circuits, each of said pair comprising two electronic devices having input and output circuits with said output circuits being connected in series to a source of power, each of said pair having a control signal source connected to one of said input circuits and a modulating signal source connected to the other of said inputs to vary the current flow in said pair of series circuits, motor means connected to be reversibly driven by the difference in current flow in said pair of series circuits, a standard signal source, and switch means for rendering only said control signal sources ineffective and connecting said standard signal source to control the current flow in said pair of series circuits for balancing the current flows in said pair of series circuits.

8. Control apparatus comprising in combination, a controlled motor, a pair of current flow control circuits connected to reversibly energize said motor, each of said pair of control circuits having an input signal of different predetermined frequencies, means rectifying said input signals and connected to control the current flow in said pair of circuits in accordance with the magnitude of said different frequencies, a standard signal source comprising a pair of oscillators tuned to said different predetermined frequencies and of equal magnitude, a controller connected to render said input signals ineffective and connect said standard signal source to said rectifying means, a second motor means, means including said controller for connecting said pair of circuits in controlling relation to said second motor means when said standard signal source is ineffective, and means connecting said second motor means to balance the current flow in said pair of control circuits.

9. Control apparatus, comprising in combination, a controlled motor, a pair of current flow control circuits operatively connected to said motor, each of said pair having an input circuit which has a variable direct current control signal thereon to control the current flow in the respective circuit, a standard direct current signal source, periodically operating switch means, means including said switch means for rendering said input circuits ineffective and connecting said standard signal source to said control circuits, and means synchronously energized with the operation of said switch means for balancing the current flow in said control circuits.

10. Control apparatus, comprising in combination, an alternating current reversible motor, said motor being operative at a first frequency, a pair of current flow control circuits, each of said pair having a separate variable direct current input signal source and means for varying said input signal at said first frequency, means connecting said pair to reversibly control said motor, a standard signal source of a second frequency, a second alternating current reversible motor being operative when energized by a signal of said second frequency, means connecting said pair of control circuits to said second motor means, control means for disconnecting said input signal sources and connecting said standard signal source to said pair of control circuits, and means connecting said second motor means to balance the current flow in said pair of circuits.

11. Control apparatus, comprising in combination, an alternating current, a reversible motor, said motor being operative at a first frequency, a pair of current flow control circuits, each of said pair having a separate variable direct current input signal source and means for varying said input signal at said first frequency, means connecting said pair to reversibly control said motor, a standard signal source of a second frequency, a pair of circuits tuned to said second frequency and coupled to said pair of control circuits, control means actuated by differences in current flows in said tuned circuits, switch means for disconnecting said input signal sources and connecting said standard signal source to said pair of control circuits, and means connecting said control means to balance the current flow in said pair of control circuits.

12. Control apparatus, comprising in combination, a controlled motor, a pair of current flow control circuits operatively connected to said motor, each of said pair having an input circuit which has a variable direct current control signal thereon to control the current flow in the respective circuit, a standard direct current signal source, periodically operating switch means, means including said switch means for rendering said input circuits ineffective and connecting said standard signal source to said control circuits, a second motor arranged to be energized by said pair of control circuits, means connecting said second motor means to regulate the current flow in said pair of circuits, a pair of switching tubes connected between said control circuits and said controlled and second motors, and means synchronously energized with the operation of said switch means for controlling said switching tubes so that said second motor means will balance the current in said pair of control circuits.

13. Motor control apparatus comprising, a controlled alternating current motor, a pair of electronic current flow control circuits, each of said circuits having a pair of inputs one of which is connected to a control signal source and the other of which is connected to an alternating current source of frequency which corresponds to that of said motor, an output transformer having an output winding and a tapped input winding, means connecting one of said control circuits to one end of said input winding and said tap, means connecting the other end of said input winding and said tap to the other of said control circuits so that the current flow from the other of said circuits opposes that of said one circuit in said input winding, means connecting said output winding to said motor so that said motor will be operative when the current flow in said pair of control circuits is unbalanced, a standard signal source, switch means rendering said control signal source ineffective and connecting said standard signal source to control the current flow in said pair of electronic current flow control circuits, and electro-mechanical means actuated simultaneously with said switch means for balancing the current flows in said pair of current flow control circuits.

14. In a proportioning motor control system, a controlled motor, circuit means connected to reversibly control said motor in accordance with changes in a control signal, follow-up means driven by said motor and connected to said circuit means to maintain a system balance, a standard signal source, switch means rendering said control signal source and said follow-up means ineffective and connecting said standard signal source to control the current flow in said circuit means, and electro-mechanical means actuated simultaneously with said switch means for electrically balancing said circuit means while said follow-up means is ineffective.

References Cited in the file of this patent

UNITED STATES PATENTS

| | | |
|---|---|---|
| 2,371,415 | Tolson | Mar. 13, 1945 |
| 2,489,999 | Cherry | Nov. 29, 1949 |
| 2,520,462 | Hartung | Aug. 29, 1950 |
| 2,539,127 | Glass | Jan. 23, 1951 |
| 2,556,788 | Barner, Jr. | June 12, 1951 |
| 2,576,056 | Wannamaker, Jr. | Nov. 20, 1951 |
| 2,601,271 | French et al. | June 24, 1952 |

FOREIGN PATENTS

| | | |
|---|---|---|
| 584,127 | Great Britain | Jan. 8, 1947 |

OTHER REFERENCES

Proceedings of the I. R. E., vol. 37, No. 12, December 1949, pp. 1474–1478.